United States Patent
Ariki et al.

(10) Patent No.: US 12,353,997 B2
(45) Date of Patent: Jul. 8, 2025

(54) INFORMATION PROCESSING APPARATUS AND INFORMATION PROCESSING METHOD

(71) Applicant: SONY GROUP CORPORATION, Tokyo (JP)

(72) Inventors: Yuka Ariki, Tokyo (JP); Takuya Narihiri, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 974 days.

(21) Appl. No.: 17/434,855

(22) PCT Filed: Jan. 7, 2020

(86) PCT No.: PCT/JP2020/000142
§ 371 (c)(1),
(2) Date: Aug. 30, 2021

(87) PCT Pub. No.: WO2020/183877
PCT Pub. Date: Sep. 17, 2020

(65) Prior Publication Data
US 2022/0164653 A1     May 26, 2022

(30) Foreign Application Priority Data
Mar. 8, 2019   (JP) ................. 2019-042678

(51) Int. Cl.
*G06N 3/08*      (2023.01)
*G01C 21/34*     (2006.01)
*G06F 16/903*    (2019.01)

(52) U.S. Cl.
CPC ......... *G06N 3/08* (2013.01); *G06F 16/90335* (2019.01); *G01C 21/3461* (2013.01)

(58) Field of Classification Search
CPC .............. G06N 30/08; G06F 16/90335; G06T 2207/20081; G01C 21/3461
See application file for complete search history.

(56) References Cited

U.S. PATENT DOCUMENTS

| | | | |
|---|---|---|---|
| 11,449,079 B2* | 9/2022 | Lin | G06T 7/50 |
| 2013/0253827 A1* | 9/2013 | Choi | G01C 21/3446 |
| | | | 701/533 |
| 2021/0387350 A1* | 12/2021 | Oleynik | A47J 44/00 |

FOREIGN PATENT DOCUMENTS

| | | |
|---|---|---|
| JP | 2008-249536 A | 10/2008 |
| KR | 10-2013-0108898 A | 10/2013 |

OTHER PUBLICATIONS

Li, et al., "A Heuristic Search Algorithm Based on Artificial Neural Networks", Proceedings of the 2016 International Conference on Intelligent Information Processing (ICIIP'16), Article No. 51, Dec. 25, 2016, pp. 1-9.

(Continued)

*Primary Examiner* — Paul Danneman
(74) *Attorney, Agent, or Firm* — CHIP LAW GROUP

(57) ABSTRACT

Provided is an information processing apparatus including a learning unit that learns a heuristic function related to a path search by using a convolutional neural network. The learning unit includes a first convolutional neural network that outputs a first feature value based on an environment map, and a second convolutional neural network that outputs a second feature value related to an internal state of a search subject, performs learning using a loss related to a concatenated value of the first feature value and the second feature value, and outputs a heuristic map in which the heuristic function is represented as a two- or higher-dimensional image. The internal state of the search subject includes at least one element that has a degree of freedom different from a position in an environment.

19 Claims, 12 Drawing Sheets

(56) References Cited

OTHER PUBLICATIONS

Jun Tani, "Model-Based Learning for Mobile Robot Navigation from the Dynamical Systems Perspective", IEEE Transactions on Systems, Man, and Cybernetics—Part B: Cybernetics, vol. 26, No. 3, Jun. 1996, pp. 421-436.

Kenezaki, et al., "GOSELO: Goal-Directed Obstacle and Self-Location Map for Robot Navigation Using Reactive Neural Networks", IEEE Robotics and Automation Letters, vol. 3, No. 2, Dec. 14, 2017, pp. 696-703.

International Search Report and Written Opinion of PCT Application No. PCT/JP2020/000142, issued on Mar. 24, 2020, 12 pages of ISRWO.

Silver, et al., "Mastering the game of Go with deep neural networks and tree search", Nature 16961, Jan. 28, 2016, vol. 529, pp. 484-489.

* cited by examiner

FIG.12
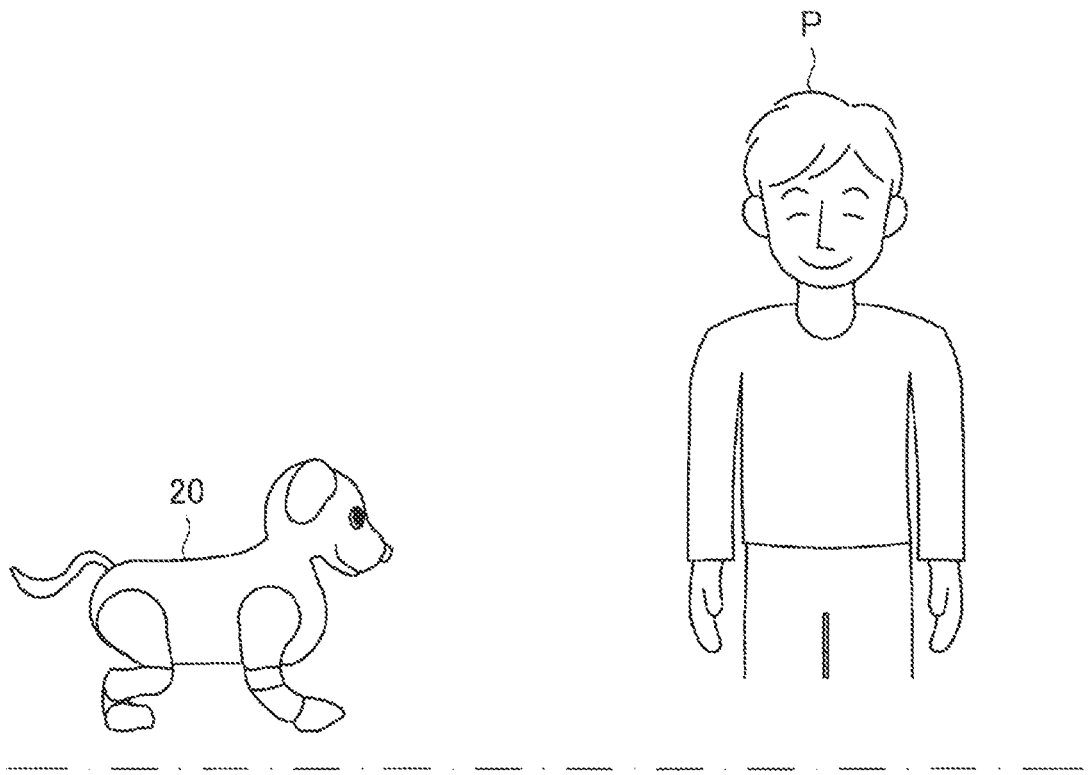
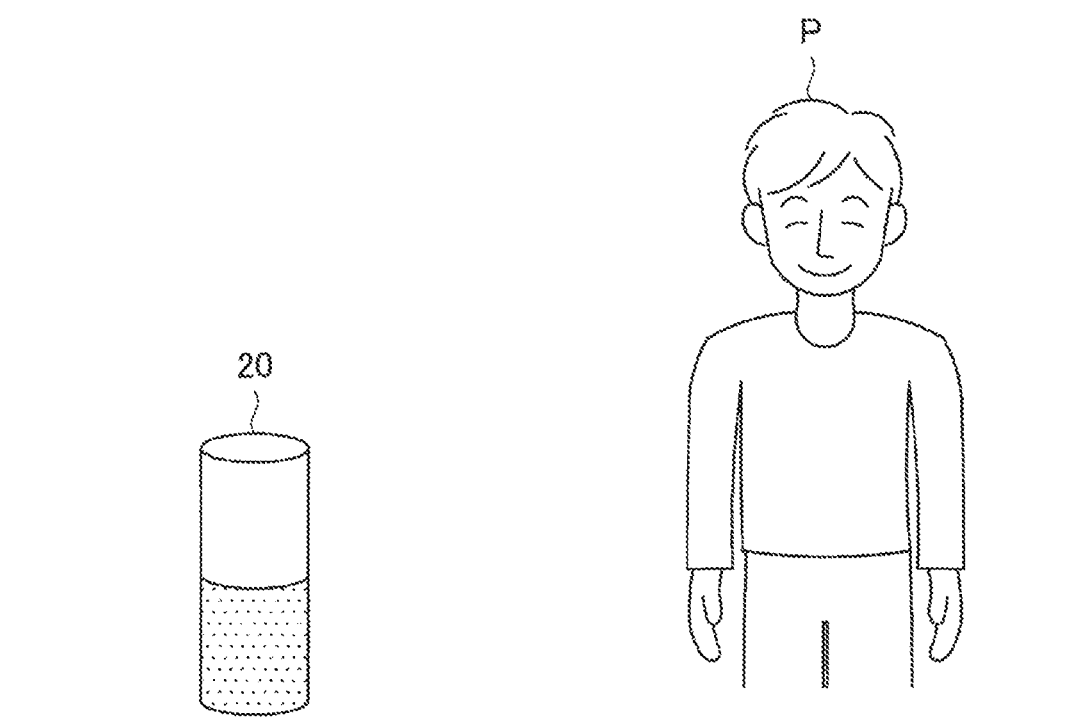

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/000142 filed on Jan. 7, 2020, which claims priority benefit of Japanese Patent Application No. JP 2019-042678 filed in the Japan Patent Office on Mar. 8, 2019. Each of the above-referenced applications is hereby incorporated herein by reference in its entirety.

FIELD

The present disclosure relates to an information processing apparatus and an information processing method.

BACKGROUND

In recent years, various path search algorithms have been studied and apparatuses that operate based on paths retrieved by the algorithms have been developed. For example, Non Patent Literature 1 discloses a computer program that searches for next action in the game of Go by using a search algorithm.

CITATION LIST

Patent Literature

Non Patent Literature 1: David Silver, et al., "Mastering the game of Go with deep neural networks and tree search", Nature, Jan. 28, 2016, volume 529, pages 484-489

SUMMARY

Technical Problem

However, the technology described in Non Patent Literature 1 is a framework for obtaining a value function and measures for a path search that is based on heuristic learning using deep learning, and is far from versatile. Further, there is room for improvement in a search time.

Solution to Problem

According to the present disclosure, an information processing apparatus is provided that includes: a learning unit that learns a heuristic function related to a path search by using a convolutional neural network, wherein the learning unit includes a first convolutional neural network that outputs a first feature value based on an environment map, and a second convolutional neural network that outputs a second feature value related to an internal state of a search subject, performs learning using a loss related to a concatenated value of the first feature value and the second feature value, and outputs a heuristic map in which the heuristic function is represented as a two- or higher-dimensional image, and the internal state of the search subject includes at least one element that has a degree of freedom different from a position in an environment.

Moreover, according to the present disclosure, an information processing apparatus is provided that includes: a search unit that performs a path search on the basis of a learned heuristic function, wherein the search unit performs a path search on the basis of the heuristic function that is obtained through learning based on a first feature value based on an environment map and a second feature value related to an internal state of a search subject and that is represented as a two- or higher-dimensional image, and the internal state of the search subject includes at least one element that has a degree of freedom different from a position in an environment.

Moreover, according to the present disclosure, an information processing method is provided that includes: learning, by a processor, a heuristic function related to a path search by using a convolutional neural network, wherein the learning includes performing learning using a first convolutional neural network that outputs a first feature value based on an environment map, a second convolutional neural network that outputs a second feature value related to an internal state of a search subject, and a loss related to a concatenated value of the first feature value and the second feature value, and outputting a heuristic map in which the heuristic function is represented as a two- or higher-dimensional image, and the internal state of the search subject includes at least one element that has a degree of freedom different from a position in an environment.

Moreover, according to the present disclosure, an information processing method is provided that includes: performing a path search on the basis of a learned heuristic function, wherein the performing the path search includes performing a path search on the basis of the heuristic function that is obtained through learning based on a first feature value based on an environment map and a second feature value related to an internal state of a search subject and that is represented as a two- or higher-dimensional image, and the internal state of the search subject includes at least one element that has a degree of freedom different from a position in an environment.

BRIEF DESCRIPTION OF DRAWINGS

FIG. 12 is a diagram for explaining a path search in interaction with a target person.

DESCRIPTION OF EMBODIMENTS

Figure 1:
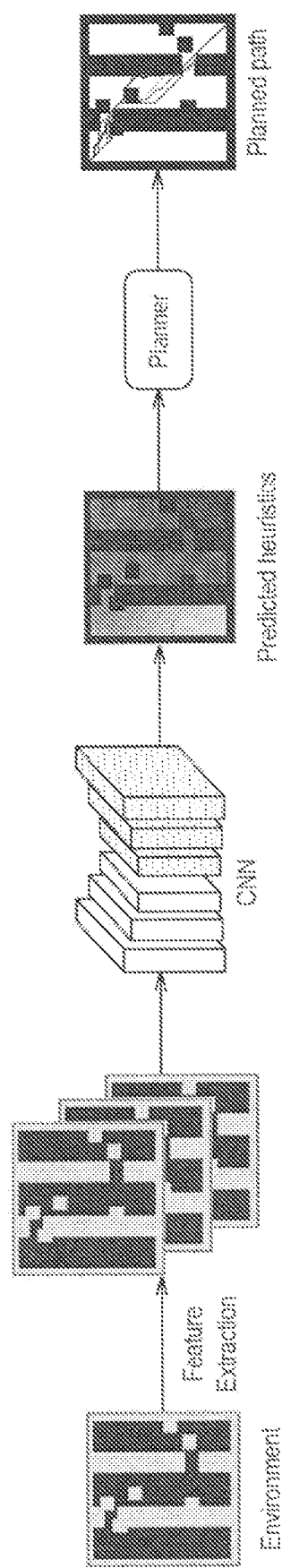
FIG. 1 is a diagram illustrating an overview of heuristic learning using a CNN.

Preferred embodiments of the present disclosure will be described in detail below with reference to the accompanying drawings. In the present specification and the drawings, structural elements that have substantially the same functions and configurations will be denoted by the same reference symbols, and repeated explanation of the structural elements will be omitted.

In addition, hereinafter, explanation will be given in the following order.
1. Embodiment
  1.1. Learning method
  1.2. Functional configuration example of learning apparatus 10
  1.3. Functional configuration example of search apparatus 20
  1.4. Effects
  1.5. Application examples
2. Hardware configuration example
3. Conclusion

1. EMBODIMENT 1.1. Learning Method

First, an overview of one embodiment of the present disclosure will be described. As described above, in recent years, an apparatus that operates based on a result of a path search using a search algorithm has been developed. Examples of the apparatus as described above include an autonomous navigation robot and various manipulators.

Further, examples of the search algorithm include a Rapidly-exploring Random Tree (RRT) and an A* search algorithm. The search algorithm, such as the RRT and the A*, performs a path search using a heuristic function.

In normal, in global path planning related to an autonomous navigation robot or manipulation, not a short time is needed for a search. Here, to reduce the search time and improve search accuracy, setting of the above-described heuristic function is important.

In general, it is often the case that the heuristic function for solving a path planning problem is set by an experimenter. However, it becomes more difficult to set an appropriate heuristic function with an increase in complexity of a path and a task, and there is a limitation in obtaining an optimal heuristic function by human works.

Here, to effectively obtain a heuristic function capable of largely reducing the search time, a method of learning a heuristic function by using a convolutional neural network (CNN) may be expected to be adopted, for example.

First, an overview of a graph search according to one embodiment of the present disclosure will be described. In an information processing method according to one embodiment of the present disclosure, search-based path planning in a graph of G=<V, E> will be adopted as a basis. In this case, the graph search according to one embodiment of the present disclosure is started from a start node $V_s$. In evaluation of each of the nodes, a successive search candidate is extended by Succ(V), and a successive edge and a child vertex are returned.

First, a search candidate vertex is given by Valid(e, v, φ). Here, e represents an environment, a value thereof is determined based on an obstacle corresponding to φ, and False is returned. Subsequently, the search candidate is evaluated by Score(v, φ), and a combination of a score and a vertex is repeatedly inserted in a queue (open list): 0, for which priority is determined by a score in a subsequent vertex open list, until a goal $V_g$ is found or no vertex is present.

In this case, a score function that is defined by a cost-so-far value of a vertex for which evaluation is currently performed is represented by Expression (1) below in the Dijkstra's search algorithm, for example. Meanwhile, the cost-so-far value as described above indicates a cumulative cost according to a shortest path that is retrieved at the time of the search.

$$Score(v,\varphi)=g(v,\varphi) \qquad (1)$$

Further, in the information processing method according to one embodiment of the present disclosure, by defining a search heuristic function h(v, φ), it is possible to derive the A* search algorithm from a score function as represented by Expression (2) below.

$$Score(v,\varphi)=g(v,\varphi)+h(v,\varphi) \qquad (2)$$

Furthermore, according to one embodiment of the present disclosure, a search that depends on only heuristics as greedy search algorithms is defined by Expression (3) below.

Next, heuristic learning using a CNN as described above will be described. According to a method as described below, it is possible to learn a good heuristic function that reduces a search cost to a minimum (reduces the number of open vertex candidates being searched for to a minimum).

FIG. 1 is a diagram illustrating an overview of the heuristic learning using the CNN. In this method, both or any one of an obstacle map and a cost function is taken as an environment, an extracted feature map is input to the CNN, and a heuristic value of each of nodes in a graph is predicted. In this case, the CNN is able to output a heuristic map in which predicted heuristic values of the respective nodes are represented as a two- or higher-dimensional image.

Further, the predicted heuristic values included in the heuristic map are used as the heuristic function h(v, φ) in a graph-search-based planner. The planner is able to perform path planning at a high speed on the basis of the heuristic map output by the CNN and an arbitrary search algorithm.

Meanwhile, the CNN used in this method may be a fully convolutional network (FCN). According to the FCN, it is possible to simultaneously predict the heuristic values related to all of the nodes in the graph (single shot inference).

In contrast, the CNN used in this method may be realized by cuDNN by implementing General-Purpose Computing On Graphics Processing Units (GPGPU), for example.

Further, in the heuristic learning using the CNN as described above, the heuristic values may be generated using a learning planner, and may be used as targets for predicted heuristic values in learning based on the CNN. Examples of the above include high-density target learning based on the RRT.

In the high-density target learning based on the RRT, the CNN is able to directly learn heuristics by reducing a squared error of a predicted cost and a target of each of the nodes to a minimum.

In this case, the cost of the vertex is defined as a cumulative cost (cost-so-far value) according to the shortest path to the target. According to the RRT, it is possible to calculate the cost-so-far value of all of valid vertices in the graph.

Furthermore, in the high-density target learning based on the RRT according to one embodiment of the present disclosure, learning is performed by minimizing a loss function as represented by Expression (4) below.

$$L(\phi, \hat{H}, M) = \sum_{v \in V}(h(v, \phi) - H(v))^2 M(v) \quad (4)$$

Here, H in Expression (4) above represents a target cost value map (cost-to-go value map) that is generated by the RRT, and M represents a mask for neglecting an invalid vertex that is not searched for by the RRT (for example, an area occupied by an obstacle or an area enclosed by an obstacle).

Thus, one example of the heuristic learning method using the CNN has been described above. The case in which the RRT is used as the search algorithm has been described above, but it may be possible to adopt A* or inverse Dijkstra as the search algorithm. According to the learning method as described above, it is possible to largely reduce a search time and learn versatile heuristics. Meanwhile, Japanese Laid-open Patent Publication No. 2018-114295, which has been applied by the applicants of the present disclosure, may be referred to for details of the learning method as described above.

In contrast, when various path searches are performed based on the learned heuristics, in some cases, an internal state of a search subject may be important in addition to a position of the search subject in an environment. Here, the internal state of the search subject as described above may include an element that has a degree of freedom different from the position (coordinates) in the environment, in particular, an element that has a nonholonomic degree of freedom.

Figure 2:
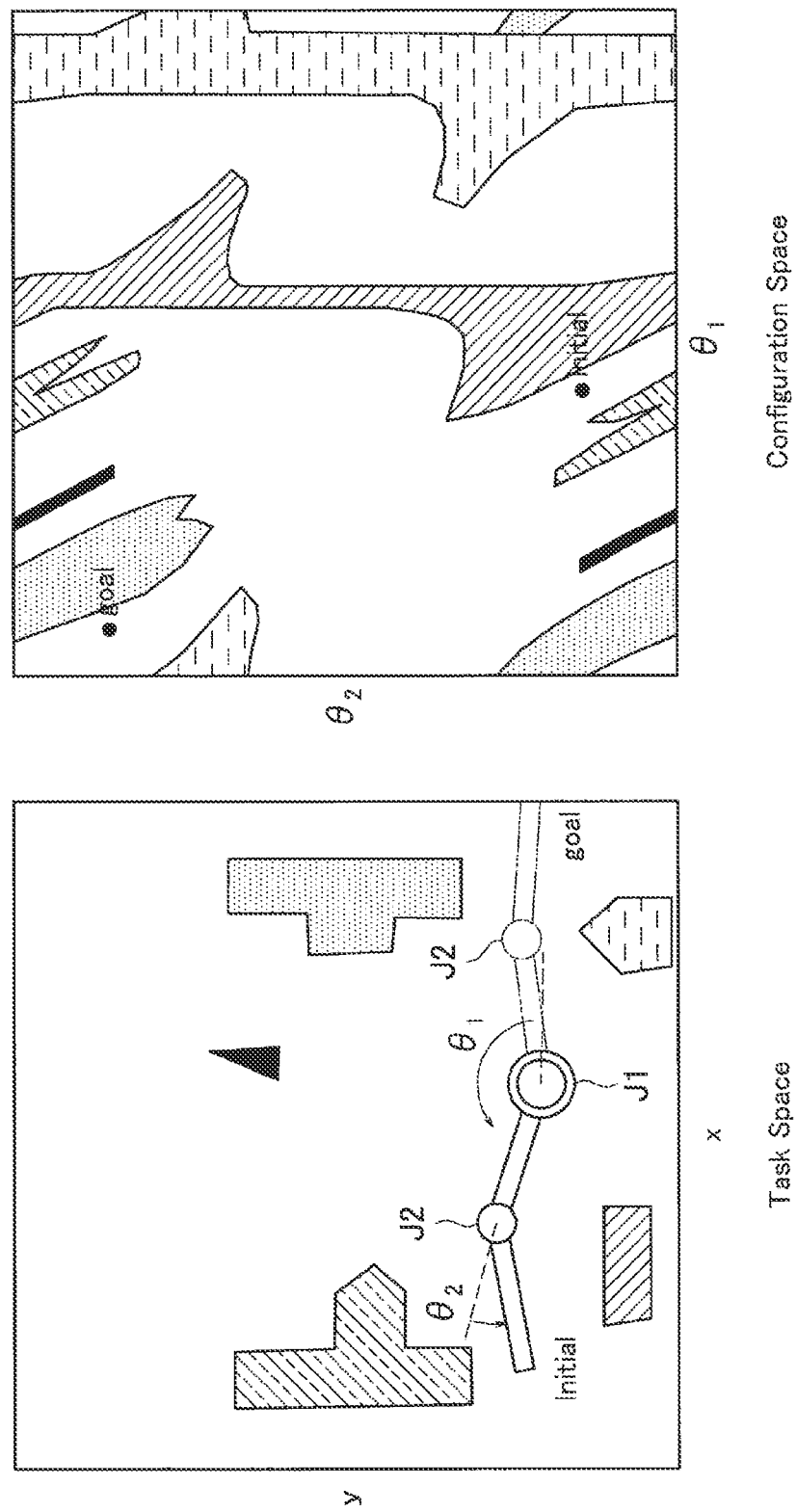
FIG. 2 is a diagram illustrating an example of an internal state of a search subject according to one embodiment of the present disclosure.

FIG. 2 is a diagram illustrating an example of the internal state of the search subject according to one embodiment of the present disclosure. On the left side in FIG. 2, an example of a case is illustrated in which a hand of a manipulator with two joint angles J1 and J2 in a task space including a plurality of obstacles is moved from an initial position to a goal position.

Here, if movement of the hand of the manipulator in the task space is regarded as a path search, the joint angles J1 and J2 are elements each having a nonholonomic degree of freedom, and it is necessary to appropriately adjust a rotation angle $\theta_1$ of the joint angle J1 and a rotation angle $\theta_2$ of the joint angle J2 in order to move the hand of the manipulator to the goal position while avoiding the obstacles. In other words, the movement of the hand is largely affected by an internal state of the manipulator including the rotation angle $\theta_1$ of the joint angle J1 and the rotation angle $\theta_2$ of the joint angle J2.

In this case, for example, it may be possible to control a hand position in conjunction with each of the joint angles by using inverse kinematics. On the right side in FIG. 2, an example of a configuration space is illustrated that represents relationships between the hand position and the obstacles when the horizontal axis represents the rotation angle $\theta_1$ of the joint angle J1 and the vertical axis represents the rotation angle $\theta_2$ of the joint angle J2. In this manner, with use of the inverse kinematics, it is possible to obtain the rotation angle of each of the joint angles from the hand position by back calculation.

However, the number of dimensions of the configuration space is increased with an increase in the number of the joint angles. Therefore, in the conventional inverse kinematics, if the number of the joint angles, in other words, the number of elements each having a degree of freedom, increases, a time needed for calculation increases and calculation itself may become difficult.

The technical idea according to one embodiment of the present disclosure is conceived in view of the foregoing situation, and makes it possible to learn a versatile heuristic function that largely reduces a search time in a path search that is largely affected by the internal state of the search subject. To cope with this, a learning apparatus 10 that implements the information processing method according to one embodiment of the present disclosure includes a learning unit 120 that learns a heuristic function related to a path search by using a convolutional neural network. As one of features, the learning unit 120 according to one embodiment of the present disclosure includes a first convolutional neural network that outputs a first feature value based on an input environment map and a second convolutional neural network that outputs a second feature value related to an input internal state of a search subject, performs learning using a loss related to a concatenated value of the first feature value and the second feature value, and outputs a heuristic map in which the heuristic function is represented as a two- or higher-dimensional image. Further, the internal state of the search subject as described above includes at least one element that has a degree of freedom different from a position in an environment.

Figure 3:
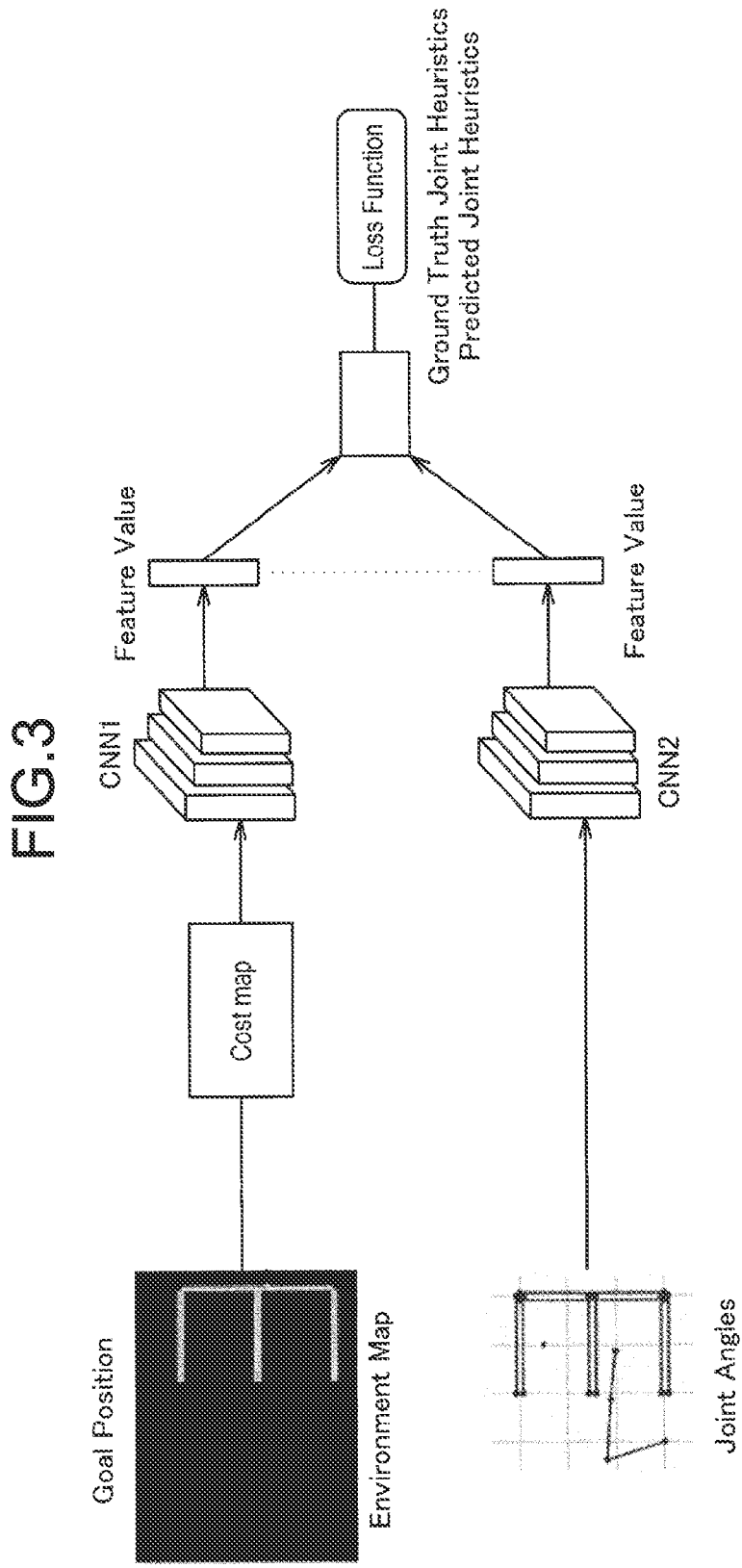
FIG. 3 is a diagram for explaining a method of learning a heuristic function according to the present embodiment.

FIG. 3 is a diagram for explaining a method of learning a heuristic function according to one embodiment of the present disclosure. As one of features, the learning unit 120 of the learning apparatus 10 according to the present embodiment learns heuristics to a goal position corresponding to the internal state of the search subject by using a combination of a feature value related to the environment map and the goal position and a feature value related to the internal state of the search subject.

To cope with this, the learning unit 120 according to one embodiment of the present disclosure includes a first convolutional neural network (CNN1) and a second convolutional neural network (CNN2). Both of the CNN1 and the CNN2 may be fully convolutional networks.

The CNN1 according to one embodiment of the present disclosure outputs a first feature value (feature space) based on the environment map including information on an obstacle in the environment and the goal position. The CNN1 according to one embodiment of the present disclosure may output the first feature value that is represented as the same dimensional image as the environment map. The first feature value according to one embodiment of the present disclosure may be regarded as a heuristic map in which the internal state of the search subject is not reflected.

More specifically, a cost map that is extracted based on the two- or higher-dimensional environment map is input to the CNN1 according to one embodiment of the present disclosure. Here, the cost map as described above may include a two- or higher-dimensional map, information on an obstacle in the two- or higher-dimensional map as described above, and path information in the two- or higher-dimensional map.

Meanwhile, the information on the obstacle as described above may include information on a distance from the obstacle, for example. Further, the path information as described above may include information on a cost to the goal position. The cost to the goal position may be represented by, for example, a distance to the goal position. Further, the distance to the goal position may be added, as a channel, to the image, for example.

Next, the CNN2 according to one embodiment of the present disclosure will be described. The CNN2 according to one embodiment of the present disclosure outputs a second feature value (feature space) related to the internal state of the search subject. Meanwhile, the internal state of the search subject according to one embodiment of the present disclosure may include an element that has a nonholonomic degree of freedom as described above. FIG. 3 illustrates an example of a case in which the states of the joint angles are used as the internal state of the search subject. In this case, the second feature value may be a cost-to-go value map related to the joint angles.

The first feature value output by the CNN1 and the second feature value output by the CNN2 are concatenated and input to the loss function. The concatenated value of the first feature value and the second feature value is regarded as a heuristic map that is represented as the same dimensional image as the environment map and that corresponds to the internal state of the search subject.

The loss function according to one embodiment of the present disclosure calculates an error between the input concatenated value, that is, the heuristic map (Predicted Joint Heuristics) and a true value (Ground Truth Joint Heuristics), and inputs the error to the CNN1 and the CNN2. Further, the CNN1 and the CNN2 calculates a gradient and updates a weight on the basis of the input error.

Thus, the method of learning the heuristic function according to one embodiment of the present disclosure has been explained above. According to the method as described above, it is possible to learn the heuristic function corresponding to the internal state of the search subject, such as the joint angles, and it is possible to largely reduce the search time.

1.2. Functional Configuration Example of Learning Apparatus 10

Figure 4:
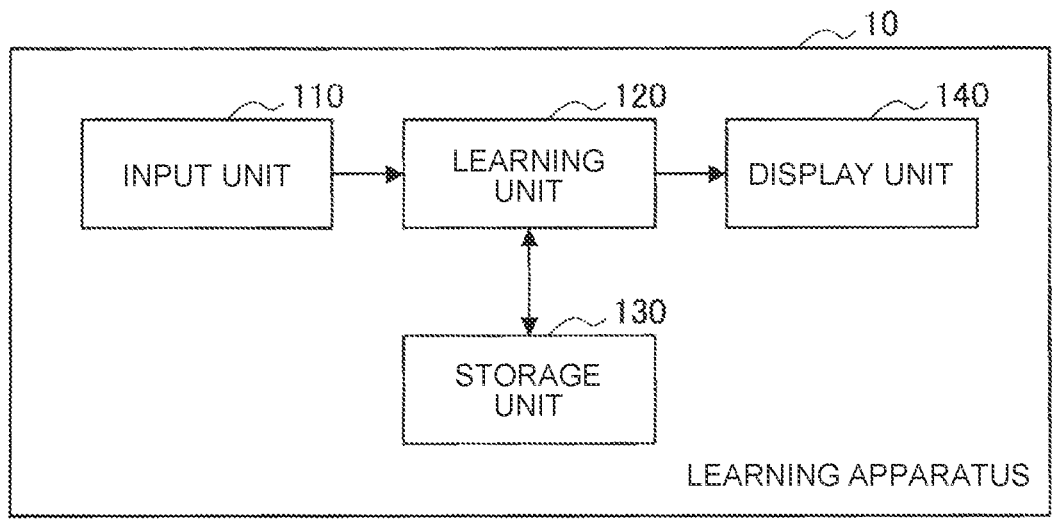
FIG. 4 is a block diagram illustrating a functional configuration example of a learning apparatus according to the present embodiment.

A functional configuration example of the learning apparatus 10 according to one embodiment of the present disclosure will be described below. The learning apparatus according to one embodiment of the present disclosure is an information processing apparatus that learns heuristics corresponding to the internal state of the search subject by using the CNN1 and the CNN2 as described above, and outputs a heuristic map in which a heuristic function is represented as a two- or higher-dimensional image. FIG. 4 is a block diagram illustrating a functional configuration example of the learning apparatus 10 according to one embodiment of the present disclosure. With reference to FIG. 4, the learning apparatus 10 according to one embodiment of the present disclosure includes an input unit 110, the learning unit 120, a storage unit 130, and a display unit 140.

Input Unit 110

The input unit 110 according to one embodiment of the present disclosure receives an image, various kinds of data, operation information from a user, and the like. The input unit 110 according to one embodiment of the present disclosure includes, for example, a keyboard, a mouse, a touch panel, or the like.

Learning Unit 120

The learning unit 120 according to one embodiment of the present disclosure has a function to learn a heuristic function corresponding to the internal state of the search subject by using the CCN1 and the CNN2. As described above, one of features of the learning unit 120 according to one embodiment of the present disclosure is to perform learning using a loss related to the concatenated value of the first feature value and the second feature value and output a heuristic map in which a heuristic function is represented as a two- or higher-dimensional image.

Storage Unit 130

The storage unit 130 according to one embodiment of the present disclosure stores therein a program, data, and the like that are used by each of the components included in the learning apparatus 10. The storage unit 130 according to one embodiment of the present disclosure stores therein, for example, various parameters related to the CNN1 and the CNN2, the heuristic map output by the learning unit 120, and the like.

Display Unit 140

The display unit 140 according to one embodiment of the present disclosure displays various kinds of visual information. To cope with this, the display unit 140 according to one embodiment of the present disclosure includes a display device for presenting the visual information, or the like. Examples of the display device as described above include a liquid crystal display (LCD) device, an organic light emitting diode (OLED) device, and a touch panel.

The display unit 140 according to one embodiment of the present disclosure displays, for example, a process of learning performed by the learning unit 120, the heuristic map output by the learning unit 120, and the like.

Thus, the functional configuration example of the learning apparatus 10 according to one embodiment of the present disclosure has been described above. Meanwhile, the configuration described above with reference to FIG. 4 is one example, and the functional configuration of the learning apparatus 10 according to one embodiment of the present disclosure is not limited to this example. The functional configuration of the learning apparatus 10 according to one embodiment of the present disclosure may be flexibly modified depending on specifications or operation.

1.3. Functional Configuration Example of Search Apparatus 20

A functional configuration example of a search apparatus 20 according to one embodiment of the present disclosure will be described below. The search apparatus according to one embodiment of the present disclosure is one example of the search apparatus as described above, and is an information processing apparatus that performs a path search using a heuristic map generated by the learning apparatus 10 and a predetermined search algorithm. The search apparatus 20 according to one embodiment of the present disclosure may be, for example, various manipulators, an autonomous navigation robot, or the like.

Figure 5:
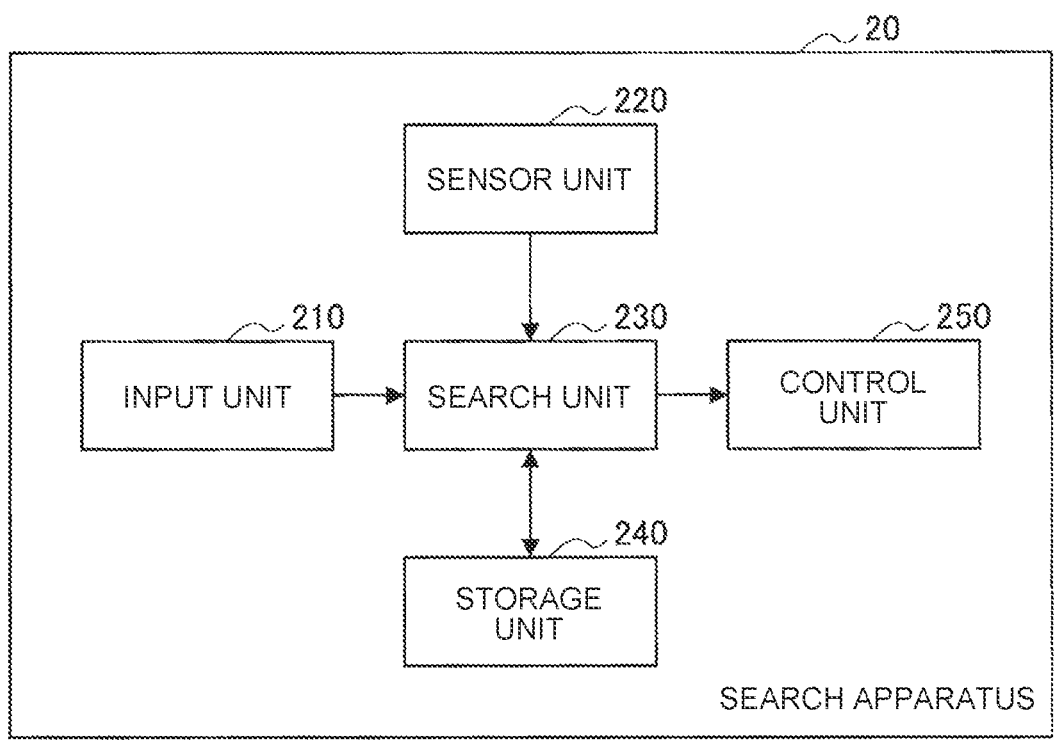
FIG. 5 is a block diagram illustrating a functional configuration example of a search apparatus according to the present embodiment.

FIG. 5 is a block diagram illustrating a functional configuration example of the search apparatus 20 according to one embodiment of the present disclosure. With reference to FIG. 5, the search apparatus 20 according to one embodiment of the present disclosure includes an input unit 210, a sensor unit 220, a search unit 230, a storage unit 240, and a control unit 250.

Input Unit 210

The input unit 210 according to one embodiment of the present disclosure receives an image including a heuristic map, various kinds of data, operation information from a user, and the like. The user is able to set a goal position or the like via the input unit 210, for example. The input unit 210 according to one embodiment of the present disclosure includes, for example, a keyboard, a mouse, a touch panel, a button, or the like.

Sensor Unit 220

The sensor unit 220 according to one embodiment of the present disclosure has a function to sense a state of a surrounding environment. The sensor unit 220 according to one embodiment of the present disclosure includes, for example, various optical sensors including an imaging sensor and an infrared sensor, an acceleration sensor, a gyro sensor, a geomagnetic sensor, a thermal sensor, a vibration sensor, a global navigation satellite system (GLASS) signal receiving apparatus, and the like.

Further, the sensor unit 220 according to one embodiment of the present disclosure may estimate a surrounding environment or a state of the search apparatus, recognize an obstacle, or estimate a subject position, on the basis of collected sensor information.

Search Unit 230

The search unit 230 according to one embodiment of the present disclosure has a function to perform a path search on the basis of the heuristic function learned by the learning apparatus 10. More specifically, as one of features, the search unit 230 according to one embodiment of the present disclosure performs a path search on the basis of the heuristic function that is obtained through learning based on the first feature value based on the environment map and the second feature value related to the internal state of the search subject, and that is represented as a two- or higher-dimensional image. Further, the internal state of the search subject as described above includes at least one element that has a degree of freedom different from a position in the environment.

According to the feature of the search unit 230 in one embodiment of the present disclosure as described above, it is possible to largely reduce the number of steps needed for a search and realize an increase in the speed of an entire task in a path search that is affected by the internal state of the search subject.

Meanwhile, the search unit 230 according to one embodiment of the present disclosure may perform the path search by using the heuristic map learned by the learning apparatus 10 and a search algorithm, such as the RRT.

Storage Unit 240

The storage unit 240 according to one embodiment of the present disclosure stores therein a program, data, and the like that are used by each of the components included in the search apparatus 20. The storage unit 240 according to one embodiment of the present disclosure stores therein map information, a goal setting, a heuristic map, and the like, for example.

Control Unit 250

The control unit 250 according to one embodiment of the present disclosure controls operation corresponding to identification performed by the search apparatus 20, on the basis of a path retrieved by the search unit 230. For example, if the search apparatus 20 is a manipulator, the control unit 250 controls a rotation angle of a joint angle or the like, and implements various tasks. Further, for example, if the search apparatus 20 is a vehicle, the control unit 250 may control steering, an accelerator, a brake, and the like and perform autonomous driving.

Thus, the functional configuration of the search apparatus 20 according to one embodiment of the present disclosure has been described above. Meanwhile, the functional configuration described above with reference to FIG. 5 is one example, and the functional configuration of the search apparatus 20 according to one embodiment of the present disclosure is not limited to this example. The search apparatus 20 according to one embodiment of the present disclosure may include a configuration to be controlled by the control unit 250, in accordance with characteristics of the apparatus, for example. The functional configuration of the search apparatus 20 according to one embodiment of the present disclosure may be flexibly modified depending on specifications or operation.

1.4. Effects

Effects of the path search using the heuristic map according to one embodiment of the present disclosure will be described below. For examinations, a 2D grid data set that is provided for a path search for a manipulator is used. The data set as described above includes eight different environments, and each of the environments includes 800 training 2D grid maps (including a single obstacle or no obstacle) and 100 test 2D grid maps, all of which are binary images.

Further, each of the grid maps includes a space of 180× 160 (pixels), and an obstacle may be included in each of the grids. Here, it is assumed that each of the pixels in the grid maps serves as a vertex, and a path search problem from a start vertex to a goal vertex is considered. Further, a cost is defined as a distance of the path.

Meanwhile, in the path search, a heuristic function learned by the information processing method according to one embodiment of the present disclosure as described above is used, and the RRT is adopted as the search algorithm.

Figure 6:
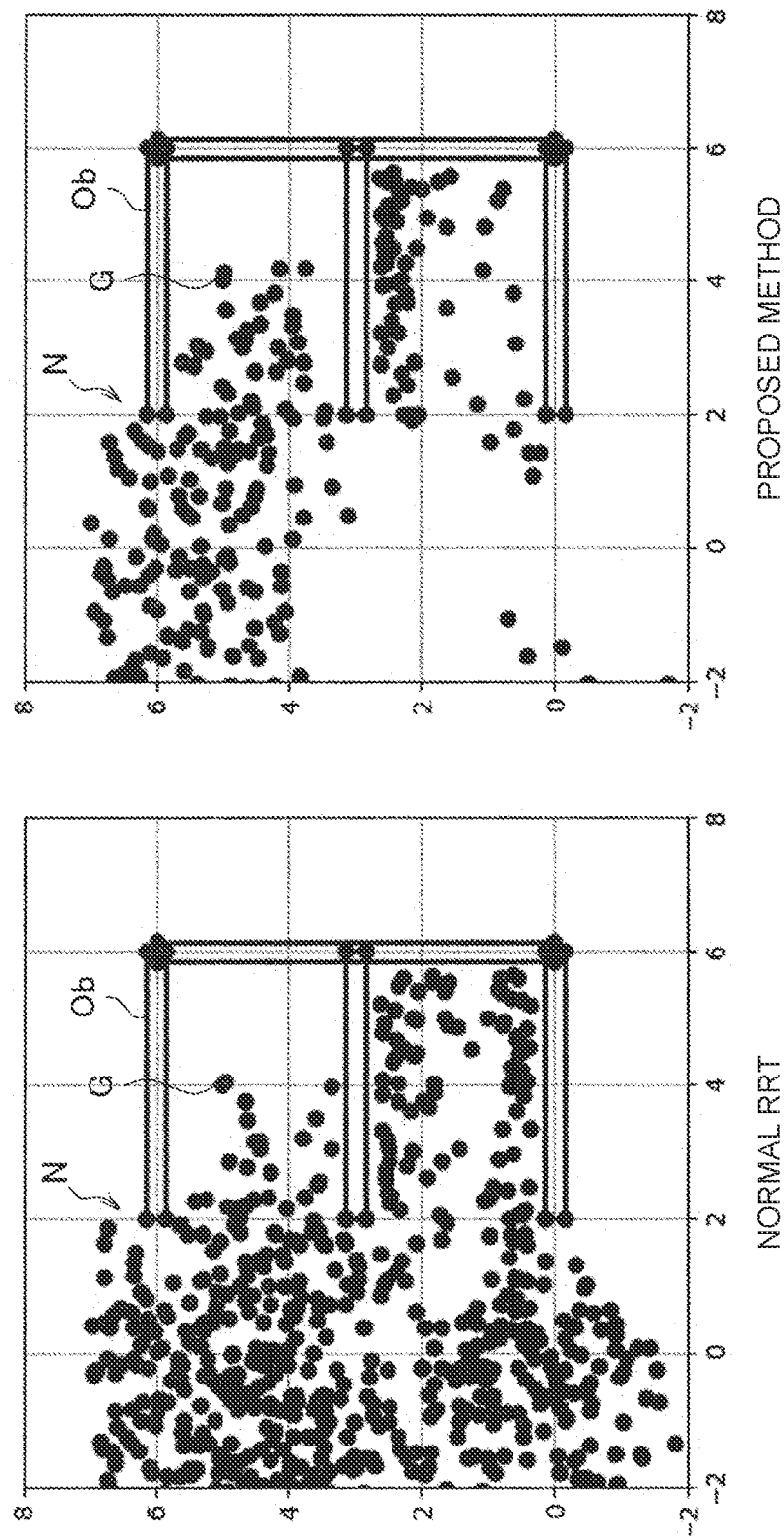
FIG. 6 is a diagram illustrating node maps that are generated through path searches using an information processing method according to the present embodiment and a normal RRT.

FIG. 6 is a diagram illustrating node maps that are generated through path searches using the information processing method according to one embodiment of the present disclosure and a normal RRT. On the left side in FIG. 6, a plurality of nodes N that are retrieved by the normal RRT in the 2D grid map are illustrated, and on the right side in FIG. 6, a plurality of nodes that are retrieved by the information processing method according to one embodiment of the present disclosure (also referred to as a proposed method) are illustrated. Meanwhile, in each of the 2D grid maps, a same obstacle Ob is present at the same position and a same goal position G is set.

Here, by comparison between both of the 2D grid maps, it can be understood that the number of nodes N retrieved by the proposed method is extremely smaller than the number of nodes retrieved by the normal RRT.

Figure 7:
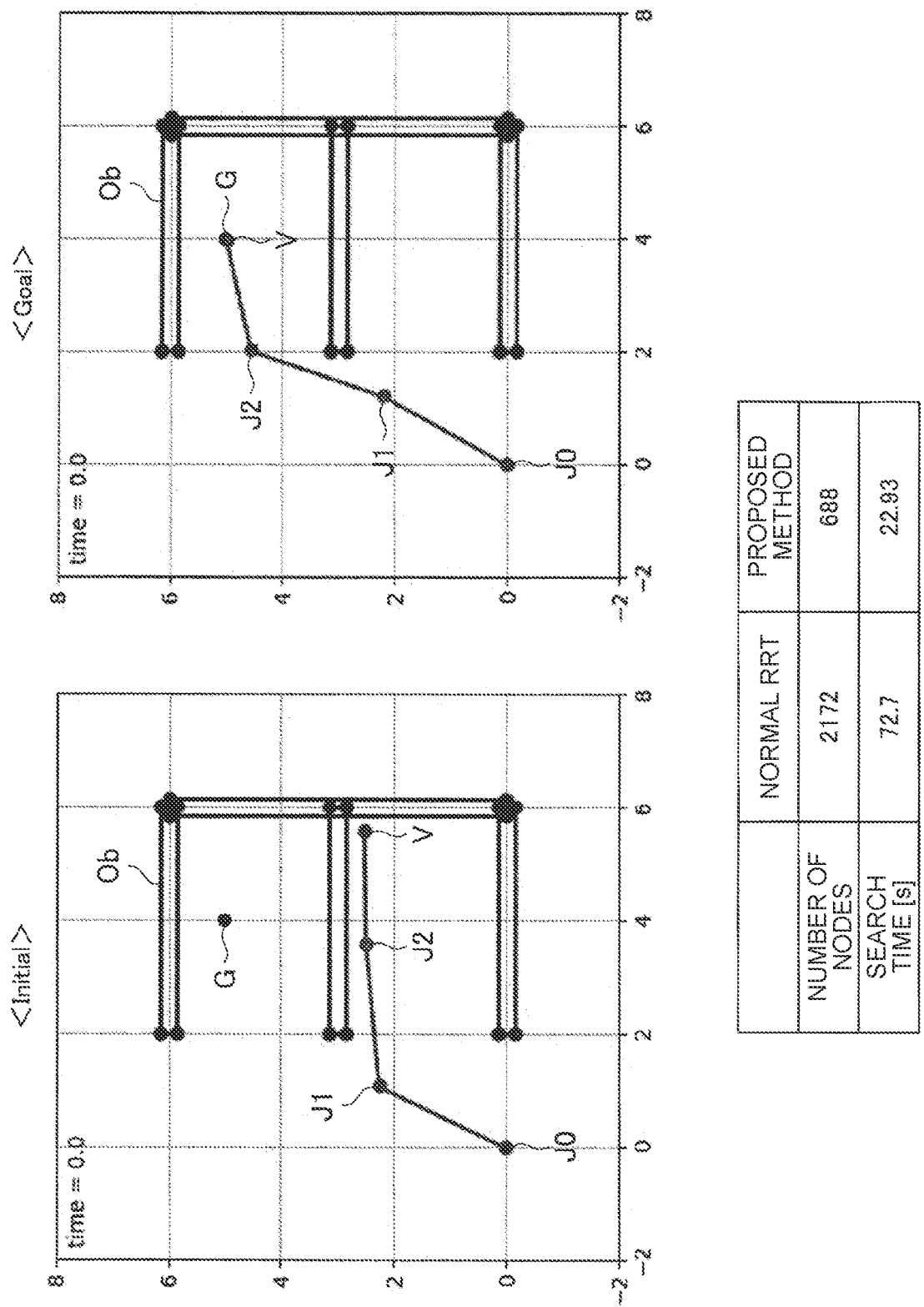
FIG. 7 is a diagram illustrating comparison of the number of nodes and a search time between the path searches using the information processing method according to the present embodiment and the normal RRT.
Figure 8:
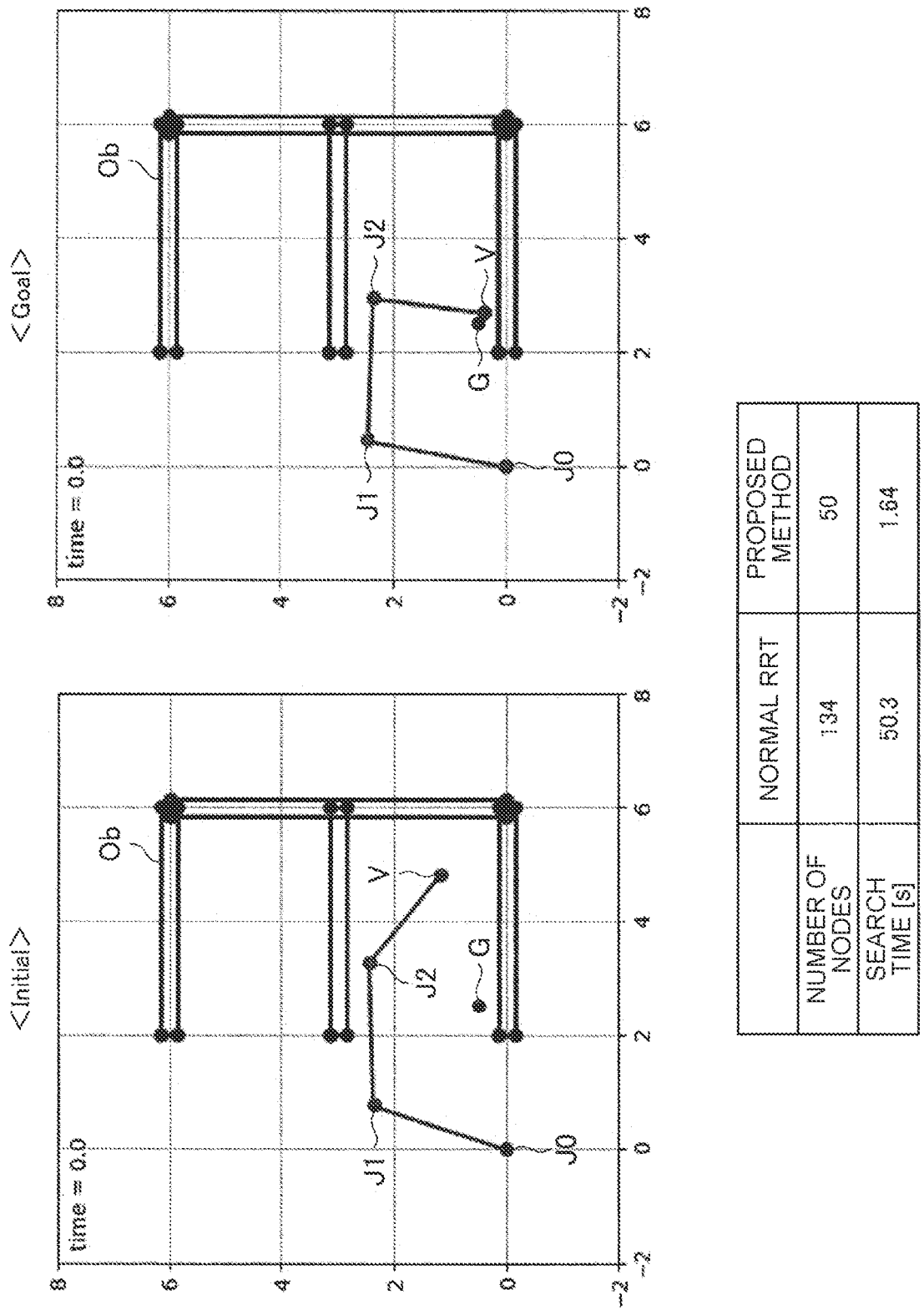
FIG. 8 is a diagram illustrating comparison of the number of nodes and the search time between the path searches using the information processing method according to the present embodiment and the normal RRT.
Figure 9:
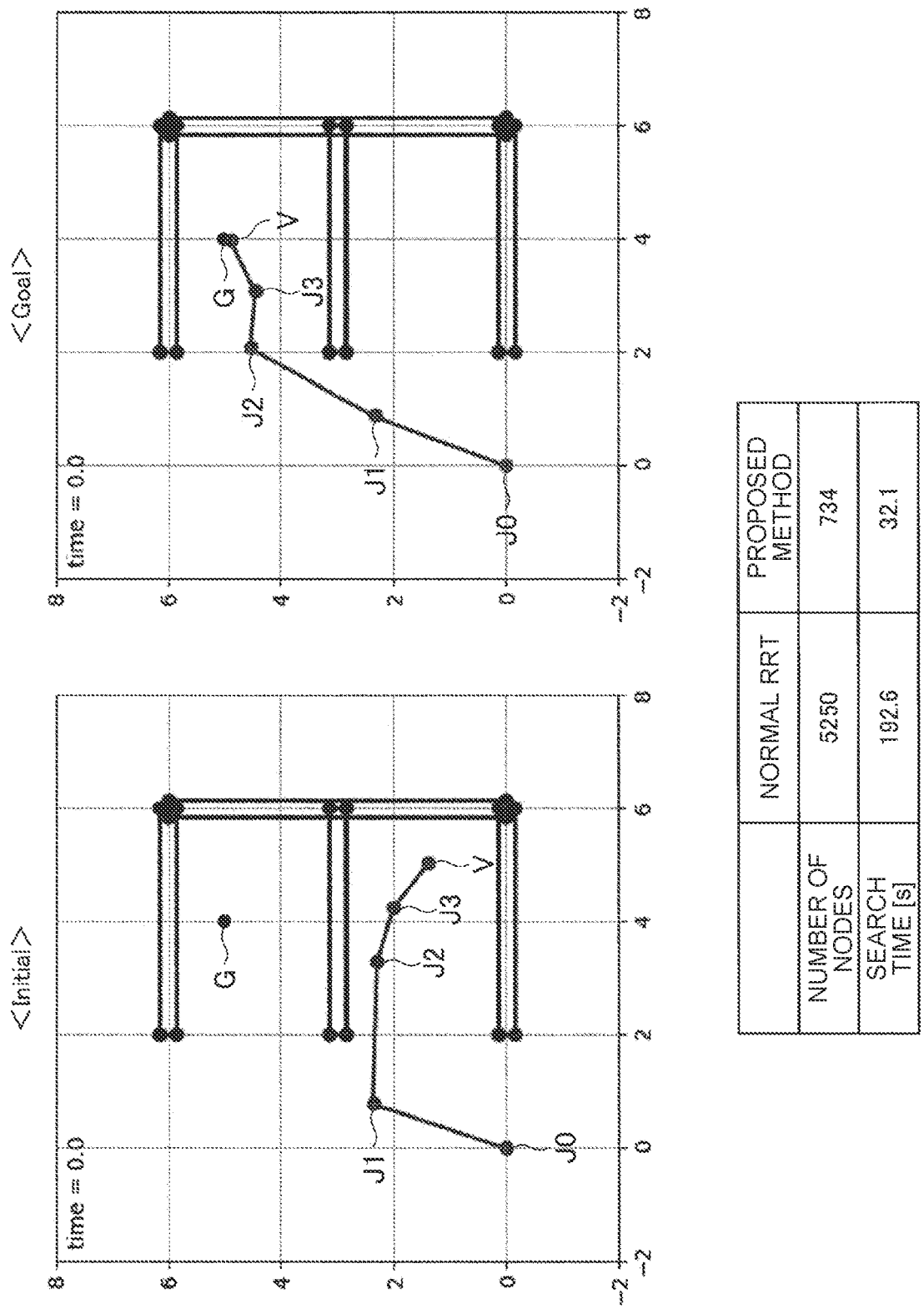
FIG. 9 is a diagram illustrating comparison of the number of nodes and the search time between the path searches using the information processing method according to the present embodiment and the normal RRT.

Further, FIG. 7 to FIG. 9 are diagrams illustrating comparison of the number of nodes and a search time between the path searches using the information processing method according to one embodiment of the present disclosure and the normal RRT. FIG. 7 illustrates comparison of the number of nodes and the search time in a case where a hand V of a manipulator including three joint angles J0 to J2 is moved from an initial position in a lower part of the obstacle Ob to a goal position G in an upper part of the obstacle Ob.

Meanwhile, values of the number of nodes and the search time illustrated in the figure are average values of 10 samples.

In an examination result as illustrated in FIG. 7, the number of nodes retrieved by the normal RRT is 2172 and the number of nodes retrieved by the proposed method is 688. Further, the search time by the normal RRT is 72.7 seconds and the search time by the proposed method is 22.93. In other words, in the environment as illustrated in FIG. 7, it can be understood that, with use of the proposed method, each of the number of nodes and the search time can be reduced to about one-third of that of the normal RRT.

Further, FIG. 8 illustrates comparison of the number of nodes and the search time in a case where the hand V of the manipulator including the three joint angles J0 to J2 is moved from the initial position in the lower part of the obstacle Ob to a goal position G in the same lower part. Meanwhile, values of the number of nodes and the search time illustrated in the figure are average values of 10 samples.

In an examination result as illustrated in FIG. 8, the number of nodes retrieved by the normal RRT is 134 and the number of nodes retrieved by the proposed method is 50. Further, the search time by the normal RRT is 50.3 seconds and the search time by the proposed method is 1.64. In this examination result, while the number of nodes retrieved by the proposed method is about one third of that of the normal RRT, the search time by the proposed method is about one-thirtieth of that of the normal RRT. This indicates that, in a simple path search, it may be possible to largely reduce the search time by using the proposed method.

Furthermore, FIG. 9 illustrates comparison of the number of nodes and the search time in a case where the hand V of the manipulator including four joint angles J0 to J3 is moved from the initial position in the lower part of the obstacle Ob to a goal position G in the the upper part of the obstacle Ob. Meanwhile, values of the number of nodes and the search time illustrated in the figure are average values of 10 samples.

In an examination result as illustrated in FIG. 9, the number of nodes retrieved by the normal RRT is 5250 and the number of nodes retrieved by the proposed method is 734. Further, the search time by the normal RRT is 192.6 seconds and the search time by the proposed method is 32.1. In other words, in the environment as illustrated in FIG. 9, it can be understood that, with use of the proposed method, it is possible to reduce the number of retrieved nodes to about one-seventh and reduce the search time to about one-sixth of those of the normal RRT. The examination result indicates that, even if a degree of complexity related to the internal state of the search increases, such as an increase in the number of joint angles or the like, the proposed method is effective and it is possible to largely reduce the number of retrieved nodes and the search time as compared to the normal RRT.

Thus, the effects of the path search using the heuristic map according to one embodiment of the present disclosure has been described above. As described above, according to the information processing method of one embodiment of the present disclosure, it is possible to learn a versatile heuristic function that largely reduces the search time and the number of retrieved nodes in a path search that is affected by the internal state of the search subject.

1.5. Application Examples

In the examination results as described above, the heuristic map according to one embodiment of the present disclosure is used in a path search in a two-dimensional space, but the heuristic map according to one embodiment of the present disclosure may be applied to a path search in a three-dimensional space in the same manner.

Figure 10:
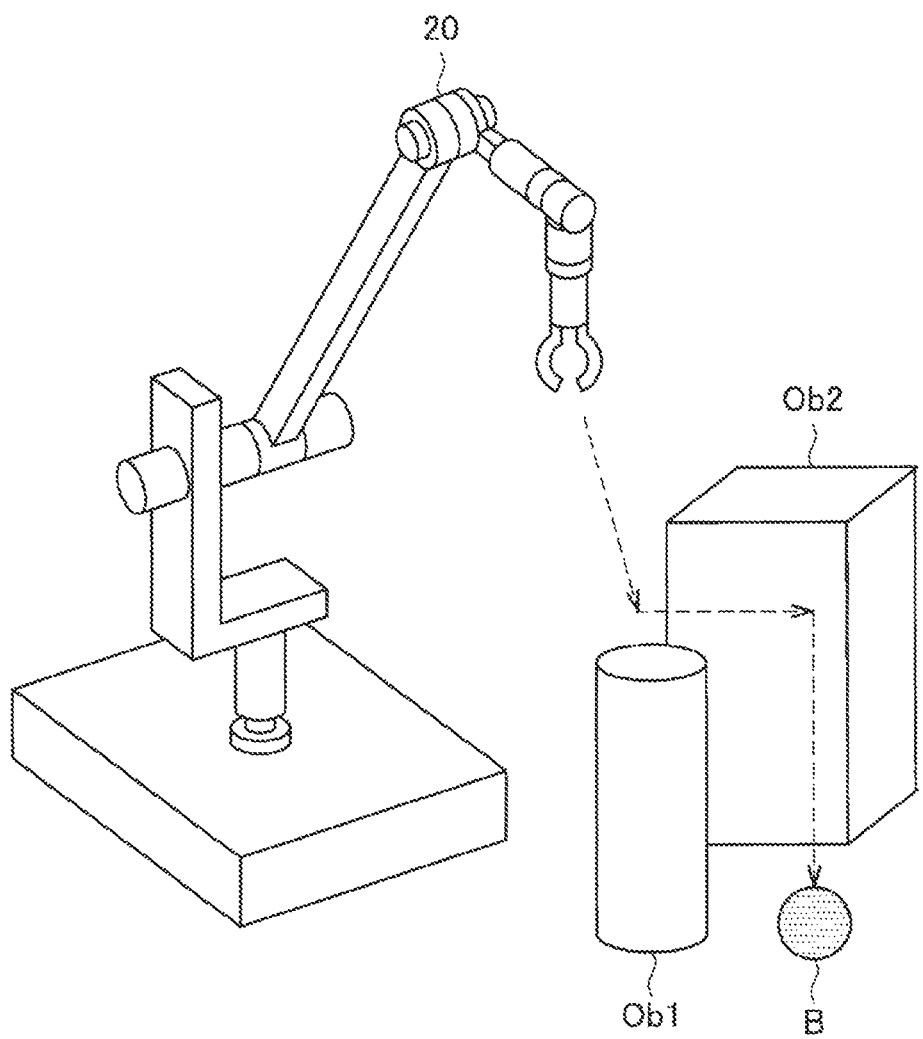
FIG. 10 is a diagram illustrating an example of a case in which a heuristic map according to the present embodiment is applied to a manipulator in a three-dimensional space.

FIG. 10 is a diagram illustrating an example of a case in which the heuristic map according to one embodiment of the present disclosure is applied to a manipulator in a three-dimensional space. FIG. 10 illustrates an example of a case in which the search apparatus 20 as a manipulator performs a task related to picking of a ball B in a three-dimensional space in which obstacles Ob1 and Ob2 are present.

In this manner, the path search using the heuristic map according to one embodiment of the present disclosure is not limited to two dimensions, but may be applied to control of a trajectory in three dimensions. In this case, the learning apparatus 10 according to one embodiment of the present disclosure may adopt a three-dimensional map as an input and output a heuristic map that is represented as a three-dimensional image.

Further, a task related to the path search using the heuristic map according to one embodiment of the present disclosure is not limited to picking, and may be applied to various tasks. The search apparatus 20 according to one embodiment of the present disclosure may be, for example, a surgery support robot including a single or a plurality of manipulators (arms).

In this case, the learning apparatus 10 may perform learning by adopting joint angles of the manipulators as the internal state, and adopting an image of a three-dimensional space in which surgery is performed, an image captured by an endoscope, or the like as an environment map. Further, in this case, the learning apparatus 10 may perform learning by adopting other manipulators, apparatuses, surgeons, and the like as obstacles. Even if physical positions of the obstacles are dynamically changed as described above, by integrally learning the environment and the internal state of the search subject, it is possible to learn heuristics that avoid collisions with the obstacles.

Figure 11:
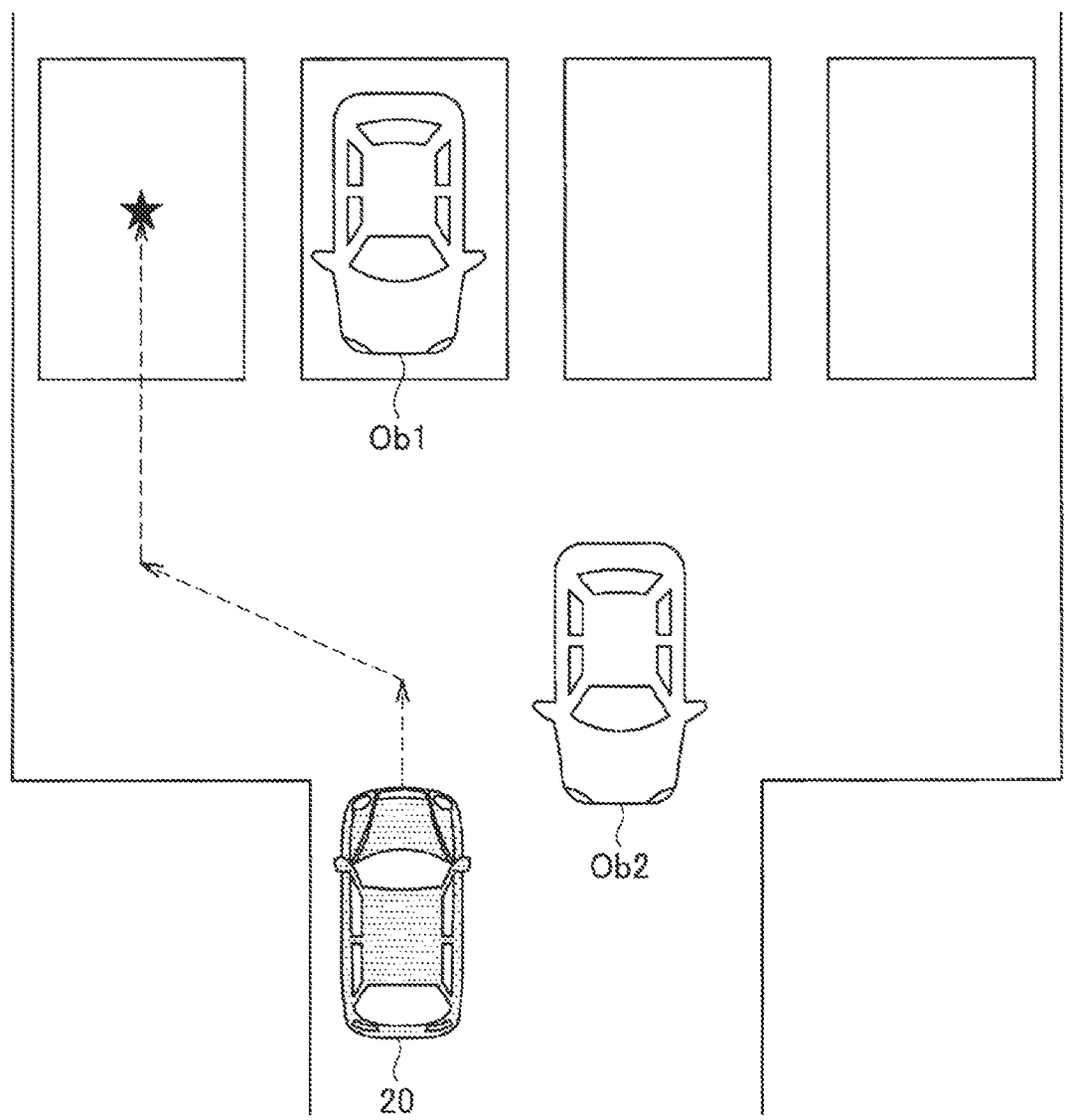
FIG. 11 is a diagram illustrating an example of a case in which the heuristic map according to the present embodiment is applied to an autonomous driving vehicle.

Furthermore, FIG. 11 illustrates an example of a case in which the search apparatus 20 that is an autonomous driving vehicle perform autonomous driving by adopting parking in a parking space as a task. In this case, the search apparatus 20 performs a path search corresponding to surrounding environments and state changes of obstacles Ob1 and Ob2 that are different vehicles recognized by the sensor unit 220, by using the heuristic map.

For example, as illustrated in the figure, when the obstacle Ob2 as a vehicle is traveling in an opposite direction, the search apparatus 20 autonomously sets a left parking space in the figure as a goal position and searches for a path to the goal position.

Meanwhile, if the obstacle Ob1 is thereafter coming in the opposite direction, there is a possibility of collision with the obstacle Ob1 while traveling to the left parking space that is initially set as the goal position in the figure; therefore, the search apparatus 20 is able to perform a path search again and determine movement to a right parking space in the figure, backward movement, stopping ahead, or the like.

In this case, the search apparatus 20 according to one embodiment of the present disclosure is able to perform the determination as described above at a high speed by performing the path search using the heuristic map as described above. In this manner, by performing the path search using the heuristic map according to one embodiment of the present disclosure, even if the autonomous driving vehicle encounters a bicycle or a pedestrian jumping in front of the vehicle for example, it is possible to search for an avoidance path at a high speed and realize safer autonomous driving.

To realize the path search as described above, the learning apparatus 10 may perform learning by adopting a steering state or the like as the internal state and by using an environment map including obstacles, such as different vehicles.

Furthermore, by performing learning by adopting an element corresponding to a purpose as the internal state, the learning apparatus 10 is able to learn heuristics appropriate for the purpose. For example, if the search apparatus 20 is a movable body, such as an autonomous driving vehicle or a drone, by performing learning by adopting a speed as the internal state, the learning apparatus 10 is able to learn heuristics that realize safer movement in accordance with the speed.

Moreover, by performing learning by adopting a remaining amount of fuel or fuel consumption as the internal state, the learning apparatus 10 may learn heuristics that realize movement with improved fuel efficiency in accordance with the state of the fuel.

Furthermore, by performing learning by adopting a state of a load as the internal state, the learning apparatus 10 is able to realize movement corresponding to the state of the load. The load as described above may include a person. For example, if the learning apparatus performs learning by adopting a weight of the load as the internal state, it is possible to learn heuristics that can realize safer movement or movement with improved fuel efficiency in accordance with the weight. Moreover, if the learning apparatus 10 performs learning by adopting a type of the load (for example, a person, a valuable item, or the like) as the internal state, it is possible to learn heuristics that can realize appropriate movement in accordance with the type.

As described above, by learning various elements according to one embodiment of the present disclosure as the internal state, it is possible to learn heuristics that realize a path search corresponding to a purpose.

Furthermore, the path search using the heuristic map according to one embodiment of the present disclosure is not limited to a path search in a physical space. FIG. 12 is a diagram for explaining a path search in interaction with a target person according to one embodiment of the present disclosure.

In an upper part in FIG. 12, an example of a case is illustrated in which the search apparatus 20 is a quadruped autonomous mobile robot that mimics an animal. The search apparatus 20 according to the present example may be a companion-type autonomous mobile robot that performs interaction with a target person P while autonomously moving joint angles arranged at four limbs, a neck, a tail, and ears, for example.

Here, if a purpose of the interaction as described above is to delight the target person P, a speech and action plan of the search apparatus 20 in the interaction with the target person P may be regarded as a path search. In this case, the goal position is an emotion, such as happiness or pleasure, and obstacles are emptions, such as anger and sadness, of the target person P. To cope with this, the learning apparatus 10 may perform heuristic learning based on an environment map that includes the above-described emptions of the target person P as obstacles and the internal state, such as a state of each of the joint angles.

Furthermore, in a lower part in FIG. 12, an example of a case is illustrated in which the search apparatus 20 is a voice agent device that provides information through conversations with the target person P. In this case, similarly to the above, by using emptions of the target person P as the goal position and the obstacles, it is possible to learn heuristics related to the interaction with the target person P, in other words, speech planning in the conversations. In this case, the learning apparatus 10 may learn, as the internal state, contents of speech and words, grammars, intonation, volume, a speed, and the like.

As described above, the path search using the heuristic map according to one embodiment of the present disclosure is not limited to a path search in a physical space, but may be widely applied to various path searches.

2. HARDWARE CONFIGURATION EXAMPLE

Figure 13:
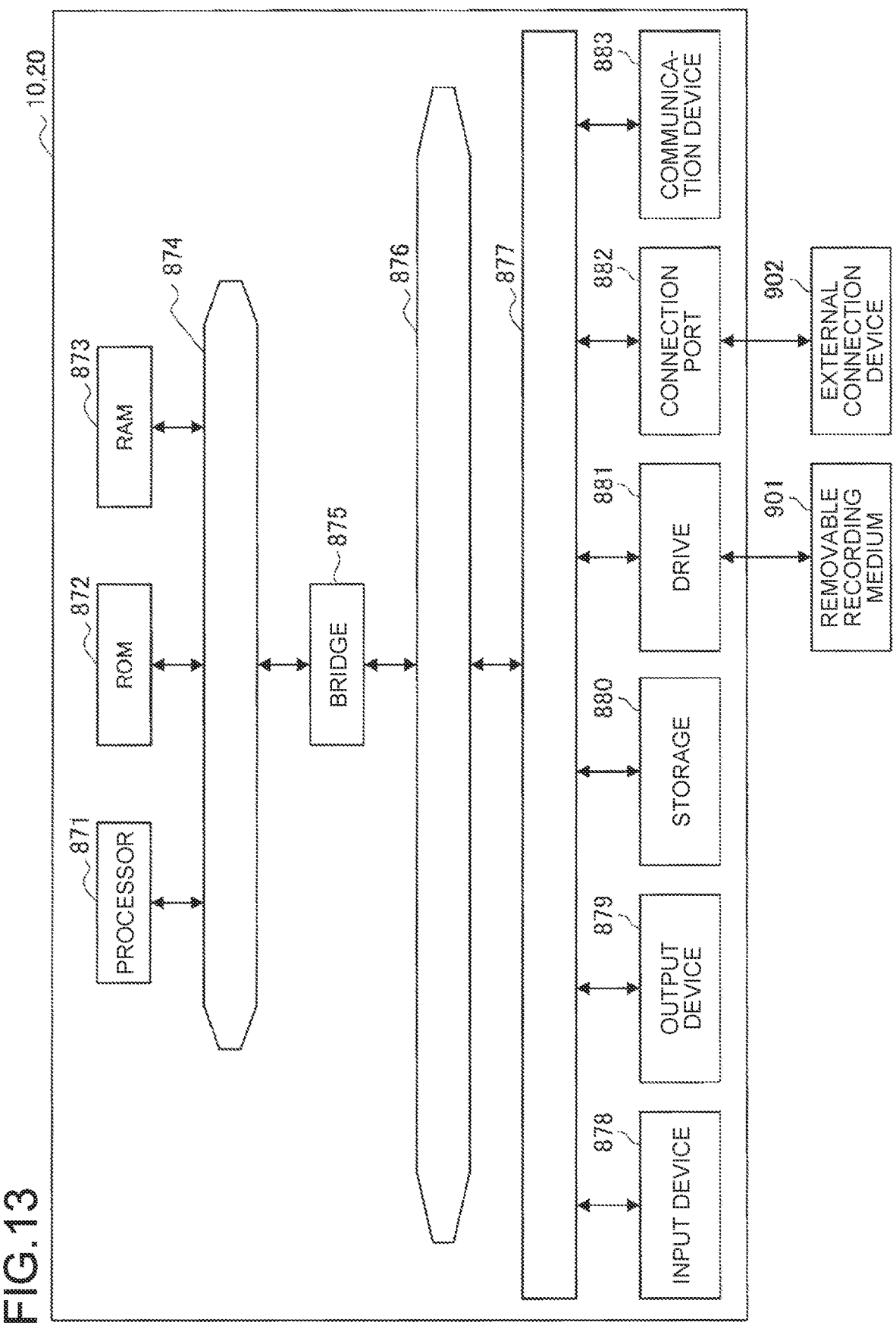
FIG. 13 is a diagram illustrating a hardware configuration example common to the learning apparatus and the search apparatus according to the present embodiment.

A hardware configuration example common to the learning apparatus 10 and the search apparatus 20 according to one embodiment of the present disclosure will be described below. FIG. 13 is a block diagram illustrating a hardware configuration example of the learning apparatus 10 and the search apparatus 20 according to one embodiment of the present disclosure. As illustrated in FIG. 13, each of the learning apparatus 10 and the search apparatus 20 includes, for example, a processor 871, a read only memory (ROM) 872, a random access memory (RAM) 873, a host bus 874, a bridge 875, an external bus 876, an interface 877, an input device 878, an output device 879, a storage 880, a drive 881, a connection port 882, and a communication device 883. Meanwhile, the hardware configuration described below is one example, and a part of the structural elements may be omitted. Further, structural elements other than the structural elements described below may be added.

Processor 871

The processor 871 functions as, for example, an arithmetic processing device or a control device, and controls the entire operation or a part of the operation of each of the structural elements on the basis of various programs that are recorded in the ROM 872, the RAM 873, the storage 880, or a removable recording medium 901.

ROM 872 and RAM 873

The ROM 872 is a means for storing a program that is to be read by the processor 871, data that is used for calculations, and the like. The RAM 873 temporarily or permanently stores therein a program that is to be read by the processor 871, various parameters that are appropriately changed when the program is executed, and the like, for example.

Host bus 874, bridge 875, external bus 876, and interface 877

The processor 871, the ROM 872, and the RAM 873 are connected to one another via the host bus 874 that is able to transmit data at a high speed. In contrast, the host bus 874 is connected to the external bus 876, for which a data transmission speed is relatively low, via the bridge 875, for example. Further, the external bus 876 is connected to various structural elements via the interface 877.

Input Device 878

As the input device 878, for example, a mouse, a keyboard, a touch panel, a button, a switch, a lever, or the like is used. Further, as the input device 878, a remote controller (hereinafter, a remote) capable of transmitting a control signal using infrared or other radio waves may be used. Furthermore, the input device 878 includes a voice input device, such as a microphone.

Output Device 879

The output device 879 is, for example, a device, such as a display device including a a cathode ray tube (CRT), an LCD, or an electroluminescence (EL), an audio output device including a speaker or headphones, a printer, a mobile phone, or a facsimile machine, that is able to visually or auditorily transfer acquired information to a user. Further, the output device 879 according to the present disclosure includes various vibration devices that are able to output tactile stimulation.

Storage 880

The storage 880 is a device for storing various kinds of data. Examples of the storage 880 include a magnetic storage device, such as a hard disk drive (HDD), a semiconductor storage device, an optical storage device, and a magneto optical storage device.

Drive 881

The drive 881 is, for example, a device that reads information stored in the removable recording medium 901, such as a magnetic disk, an optical disk, a magneto optical disk, or a semiconductor memory, or writes information to the removable recording medium 901.

Removable Recording Medium 901

The removable recording medium 901 is, for example, various semiconductor storage media, such as a digital versatile disk (DVD) medium, a Blu-ray (registered trademark) medium, or an HD DVD medium. The removable recording medium 901 may also be an integrated circuit (IC) card equipped with a contactless IC chip, an electronic device, or the like, for example.

Connection Port 882

The connection port 882 is, for example, a port, such as a universal serial bus (USB) port, an IEEE 1394 port, a small computer system interface (SCSI) port, an RS-232C port, or an optical audio terminal, for connecting an external connection device 902.

External Connection Device 902

The external connection device 902 is, for example, a printer, a mobile music player, a digital camera, a digital video camera, an IC recorder, or the like.

Communication Device 883

The communication device 883 is a communication device for establishing a connection to a network, and is, for example, a communication card for a wired or wireless LAN, Bluetooth (registered trademark), or a wireless USB (WUSB), a router for optical communication, a router for asymmetric digital subscriber line (ADSL), a modem for various kinds of communication, or the like.

3. CONCLUSION

As described above, the learning apparatus 10 that implements the information processing method according to one embodiment of the present disclosure includes the learning unit 120 that leans a heuristic function related to a path search by using a convolutional neural network. The learning unit 120 according to one embodiment of the present disclosure includes the first convolutional neural network that outputs the first feature value based on an input environment map, the second convolutional neural network that outputs the second feature value related to the input internal state of the search subject, performs learning using a loss related to a concatenated value of the first feature value and the second feature value, and outputs a heuristic map in which the heuristic function is represented as two- or higher-dimensional image. Further, the internal state of the search subject includes at least one element that has a degree of freedom different from a position in the environment. With this configuration, in the path search that is affected by the internal state of the search subject, it is possible to learn a versatile heuristic function that largely reduces a search time.

While the preferred embodiments of the present disclosure have been described in detail above with reference to the accompanying drawings, the technical scope of the present disclosure is not limited to the examples as described above. It is obvious that a person skilled in the technical field of the present disclosure may conceive various alternations and modifications within the scope of the technical idea described in the appended claims, and it should be understood that they will naturally come under the technical scope of the present disclosure.

Further, the effects described above are merely illustrative or exemplified effects, and are not limitative. That is, with or in the place of the above effects, the technology according to the present disclosure may achieve other effects that are clear to those skilled in the art from the description of this specification.

Furthermore, it is possible to generate a computer program that causes hardware, such as a CPU, a ROM, and a ROM, incorporated in a computer to implement the same functions as those of the learning apparatus 10 and the search apparatus 20, and it is possible to provide a non-transitory computer-readable recording medium that stores therein the program.

In addition, the following configurations are also within the technical scope of the present disclosure.

(1)

An information processing apparatus comprising:
 a learning unit that learns a heuristic function related to a path search by using a convolutional neural network, wherein
 the learning unit includes
 a first convolutional neural network that outputs a first feature value based on an environment map, and
 a second convolutional neural network that outputs a second feature value related to an internal state of a search subject,
 performs learning using a loss related to a concatenated value of the first feature value and the second feature value, and
 outputs a heuristic map in which the heuristic function is represented as a two- or higher-dimensional image, and
 the internal state of the search subject includes at least one element that has a degree of freedom different from a position in an environment.

(2)

The information processing apparatus according to (1), wherein the internal state of the search subject includes at least one element that has a nonholonomic degree of freedom.

(3)

The information processing apparatus according to (1), wherein the internal state of the search subject includes a state of a joint angle.

(4)

The information processing apparatus according to (1), wherein the internal state of the search subject includes a steering state.

(5)

The information processing apparatus according to (1), wherein the internal state of the search subject includes a speed.

(6)
The information processing apparatus according to (1), wherein the internal state of the search subject includes a state of fuel.
(7)
The information processing apparatus according to (1), wherein the internal state of the search subject includes a state of a load.
(8)
The information processing apparatus according to (1), wherein the internal state of the search subject includes a state of a speech.
(9)
The information processing apparatus according to any one of (1) to (8), wherein the first convolutional neural network outputs the first feature value that is represented as a same dimensional image as the environment map.
(10)
The information processing apparatus according to any one of (1) to (9), wherein
the environment map includes information on an obstacle in an environment, and
the first convolutional neural network outputs the first feature value based on the environment map and a goal position.
(11)
The information processing apparatus according to (10), wherein the first convolutional neural network adopts a cost map that is extracted based on the environment map and the goal position as an input, and outputs the first feature value.
(12)
The information processing apparatus according to (11), wherein the cost map includes a two- or higher-dimensional map, information on an obstacle in the two- or higher-dimensional map, and path information in the two- or higher-dimensional map.
(13)
The information processing apparatus according to (12), wherein the path information includes at least information on a cost to the goal position.
(14)
The information processing apparatus according to any one of (1) to (13), wherein the path search includes a speech and action plan of the search subject in interaction with a target person.
(15)
The information processing apparatus according to (14), wherein the environment map includes an emotion of the target person as an obstacle.
(16)
The information processing apparatus according to any one of (1) to (13), wherein the convolutional neural network is a fully convolutional network.
(17)
An information processing apparatus comprising:
a search unit that performs a path search on the basis of a learned heuristic function, wherein
the search unit performs a path search on the basis of the heuristic function that is obtained through learning based on a first feature value based on an environment map and a second feature value related to an internal state of a search subject and that is represented as a two- or higher-dimensional image, and
the internal state of the search subject includes at least one element that has a degree of freedom different from a position in an environment.
(18)
An information processing method comprising:
learning, by a processor, a heuristic function related to a path search by using a convolutional neural network, wherein
the learning includes
performing learning using a first convolutional neural network that outputs a first feature value based on an environment map, a second convolutional neural network that outputs a second feature value related to an internal state of a search subject, and a loss related to a concatenated value of the first feature value and the second feature value, and
outputting a heuristic map in which the heuristic function is represented as a two- or higher-dimensional image, and
the internal state of the search subject includes at least one element that has a degree of freedom different from a position in an environment.
(19)
An information processing method comprising:
performing a path search on the basis of a learned heuristic function, wherein
the performing the path search includes performing a path search on the basis of the heuristic function that is obtained through learning based on a first feature value based on an environment map and a second feature value related to an internal state of a search subject and that is represented as a two- or higher-dimensional image, and
the internal state of the search subject includes at least one element that has a degree of freedom different from a position in an environment.

REFERENCE SIGNS LIST

10 learning apparatus
110 input unit
120 learning unit
130 storage unit
140 display unit
search apparatus
210 input unit
220 sensor unit
230 search unit
240 storage unit
250 control unit

The invention claimed is:
1. An information processing apparatus, comprises:
a learning unit configured to:
receive an environment map associated with a position of a search subject, wherein the position is in an environment associated with the search subject;
receive an internal state of the search subject, wherein the learning unit includes:
a first convolutional neural network configured to output a first feature value based on the environment map; and
a second convolutional neural network configured to output a second feature value based on the internal state of the search subject:
concatenate the first feature value and the second feature value;
determine a concatenated value based on the concatenation of the first feature value and the second feature value;

determine a loss associated with the concatenated value;
perform a learning process based on the determined loss;
learn a heuristic function based on the learning process, wherein the heuristic function is associated with a path search; and
output a heuristic map, wherein
the heuristic function is represented as a two-dimensional image or an image higher than the two-dimensional image,
the internal state of the search subject includes a first element, and
the first element has a degree of freedom different from the position of the search subject in the environment.

2. The information processing apparatus according to claim 1, wherein
the internal state of the search subject further includes a second element, and
the second element has a nonholonomic degree of freedom.

3. The information processing apparatus according to claim 1, wherein
the internal state of the search subject further includes a state of a joint angle, and
the state of the joint angle is associated with the search subject.

4. The information processing apparatus according to claim 1, wherein
the internal state of the search subject further includes a steering state, and
the steering state is associated with the search subject.

5. The information processing apparatus according to claim 1, wherein
the internal state of the search subject further includes a speed, and
the speed is associated with the search subject.

6. The information processing apparatus according to claim 1, wherein
the internal state of the search subject further includes a state of fuel, and
the state of fuel is associated with the search subject.

7. The information processing apparatus according to claim 1, wherein
the internal state of the search subject further includes a state of a load, and
the state of the load is associated with the search subject.

8. The information processing apparatus according to claim 1, wherein
the internal state of the search subject further includes a state of a speech, and
the state of the speech is associated with the search subject.

9. The information processing apparatus according to claim 1, wherein
the first feature value is represented as a first image, and
a dimension of the first image and a dimension of the environment map is same.

10. The information processing apparatus according to claim 1, wherein
the environment map includes information on an obstacle in the environment, and
the first feature value is based on the environment map and a goal position.

11. The information processing apparatus according to claim 10, wherein the first convolutional neural network is further configured to:
receive a cost map, wherein an extraction of the cost map is based on the environment map and the goal position; and
output the first feature value based on the cost map.

12. The information processing apparatus according to claim 11, wherein the cost map includes at least one of
a two-dimensional map or a map higher than the two-dimensional map,
information associated with an obstacle that is in one of the two-dimensional map or the map higher than the two-dimensional map, or
path information in one of the two-dimensional map or the map higher than the two-dimensional map.

13. The information processing apparatus according to claim 12, wherein the path information includes information on a cost to the goal position.

14. The information processing apparatus according to claim 1, wherein
the path search includes a speech plan and an action plan,
the action plan is associated with the search subject, and
the search subject is in interaction with a target person.

15. The information processing apparatus according to claim 14, wherein
the environment map includes an emotion of the target person, and
the emotion is represented as an obstacle.

16. The information processing apparatus according to claim 1, wherein each of the first convolutional neural network and the second convolutional neural network is a fully convolutional network.

17. An information processing apparatus, comprises:
learning unit configured to:
receive an environment map associated with a position of a search subject, wherein the position is in an environment associated with the search subject;
receive an internal state of the search subject;
determine a first feature value based on the environment map;
determine a second feature value based on the internal state of the search subject, wherein
the internal state is represented as a two-dimensional image or an image higher than the two-dimensional image,
the internal state of the search subject includes at least one a specific element, and
the specific element has a degree of freedom different from the position of the search subject in the environment; and
learn a heuristic function based on the first feature value and the second feature value; and
a search unit configured to perform a path search based on the learned heuristic function.

18. An information processing method, comprising:
determining, by a processor, an environment map associated with a position of a search subject, wherein the position is in an environment associated with the search subject;
determining, by the processor, an internal state of the search subject;
outputting, by a first convolutional neural network, a first feature value based on the environment map;

outputting, by a second convolutional neural network, a second feature value based on the internal state of the search subject;
concatenating, by the processor, the first feature value and the second feature value;
determining, by the processor, a concatenated value based on the concatenation of the first feature value and the second feature value;
determining, by the processor, a loss associated with the concatenated value;
performing, by the processor, a learning process based on the determined loss;
learning, by the processor, a heuristic function based on the learning process, wherein the heuristic function is associated with a path search; and
outputting, by the processor, a heuristic map, wherein
the heuristic function is represented as a two-dimensional image or an image higher than the two-dimensional image,
the internal state of the search subject includes at least one a specific element, and
the specific element has a degree of freedom different from the position of the search subject in the environment.

19. An information processing method, comprising:
receiving an environment map associated with a position of a search subject, wherein the position is in an environment associated with the search subject;
receiving an internal state of the search subject;
determining a first feature value based on the environment map;
determining a second feature value based on the internal state of the search subject, wherein
the internal state is represented as a two-dimensional image or an image higher than the two-dimensional image,
the internal state of the search subject includes a specific element, and
the specific element has a degree of freedom different from the position of the search subject in the environment;
learning a heuristic function based on the first feature value and the second feature value; and
performing a path search based on the learned heuristic function.

* * * * *